US006795591B2

United States Patent
Jahng et al.

(10) Patent No.: US 6,795,591 B2
(45) Date of Patent: Sep. 21, 2004

(54) IMAGE INDEXING AND RETRIEVAL METHOD USING THE ROSETTE PATTERN FOR THE IMPROVEMENT OF RETRIEVAL EFFICIENCY AND PERFORMANCE

(75) Inventors: Surng Gahb Jahng, Koyang-si (KR); Eung Kwan Kang, Seoul (KR); Jong Soo Choi, Seoul (KR)

(73) Assignee: MultiWay Systems Co. Ltd., Seoul (KR)

( * ) Notice: Subject to any disclaimer, the term of this patent is extended or adjusted under 35 U.S.C. 154(b) by 652 days.

(21) Appl. No.: 09/874,418

(22) Filed: Jun. 5, 2001

(65) Prior Publication Data

US 2002/0039442 A1 Apr. 4, 2002

(30) Foreign Application Priority Data

Jul. 26, 2000 (KR) ........................................ 2000-43141

(51) Int. Cl.[7] ................................................ G06K 9/60
(52) U.S. Cl. ........................ 382/305; 382/170; 382/190; 707/104.1
(58) Field of Search ................................. 382/165, 170, 382/166, 173, 162, 176, 209, 224, 305, 190, 218; 707/104.1, 3, 4, 5, 6; 702/196

(56) References Cited

U.S. PATENT DOCUMENTS

| 6,584,221 B1 | * | 6/2003 | Moghaddam et al. | ....... | 382/165 |
| 6,694,311 B1 | * | 2/2004 | Smith | ............................ | 707/4 |
| 2002/0018592 A1 | * | 2/2002 | Labelle | ....................... | 382/165 |

OTHER PUBLICATIONS

"A New Indexing Method for Video Retrieval Using the Rosette Pattern", IEEE Transactions on Consumer Electronics, vol. 46, No. 3, Aug. 2000, pgs 780–784.

"Target Position Extraction Based on Instantaneous Frequency Estimatioin in a Fixed–Reticle Seeker", Optical Engineering, vol. 39, No. 9, Sep. 2000, pgs 2568–2573.

"New Infrared Counter–Countermeasure Technique Using An Iterative Self–Organizing Data Analysis Algorithm for the Rosette Scanning Infrared Seeker", Optical Engineering, vol. 39, No. 9, Sep. 2000, pp 2397–2404.

* cited by examiner

Primary Examiner—Timothy M. Johnson
Assistant Examiner—Ali Bayat
(74) Attorney, Agent, or Firm—Schweitzer Cornman Gross & Bondell LLP

(57) ABSTRACT

The present invention relates to an image indexing and retrieval method using the rosette pattern for the improvement of retrieval efficiency and performance, comprising the steps of: (a) defining a rosette pattern corresponding to the size of a subject image from which information will be extracted; (b) extracting information from the said subject image using the rosette pattern defined in the said step (a); (c) storing the information extracted in the said step (b) into a memory; (d) if a user provides a query image for information retrieval, repeating the said steps (a) and (b) with respect to the said query image; and (e) calculating the similarity between the information stored in the said step (c) and the query image information extracted in the said step (d), and conducting the retrieval using the calculated similarity.

The present invention's method has a merit in that image information may be stored and retrieved effectively through the rosette pattern, even with a small number of pixels. Furthermore, the retrieval efficiency achieved in the present invention is higher than the efficiency of the conventional histogram distribution methods. Additionally, because fewer pixels are used, the memory space required for the indexing may be reduced significantly.

4 Claims, 5 Drawing Sheets

IMAGE INDEXING AND RETRIEVAL METHOD USING THE ROSETTE PATTERN FOR THE IMPROVEMENT OF RETRIEVAL EFFICIENCY AND PERFORMANCE

BACKGROUND OF THE INVENTION

1. Field of the Invention

The present invention relates to the image indexing and retrieval method using the rosette pattern for the improvement of retrieval efficiency and performance. In particular, the present invention relates to the image retrieval method to store the image information using the rosette pattern in which the scanning is concentrated in the central area of an image, extract image information using the rosette pattern from a query image that a user wishes to retrieve, and to calculate the similarity between the stored image information and the query image through their gray histogram distribution and retrieve the requested image.

2. Description of the Related Art

Recently, as the image compression and communication technology develops rapidly, the use of digital image information increases at a formidable speed in various areas such as the Internet, VOD and digital electronic library. Accordingly, research for a method to effectively manage and retrieve image information has been actively conducted. In this regard, for the purpose of the efficient data management and retrieval, MPEG-7 standardizing project is presently in progress in order to express a subject matter with its characteristic contents.

In order to extract information from images, it is necessary to first conduct a step of obtaining the inputted images. In other words, scanning is necessary. Conventional scanning methods include the progressive scan pattern, interlaced scan pattern and the zigzag scan pattern which is used principally for compression. Using these scanning methods, the information of entire pixels constituting an image is obtained.

The progressive scan pattern is a pattern used for scanning pixels sequentially. A screen is scanned at once from the upper left part to the lower right part of the screen. Because the scan line is clear and no blinking occurs in the progressive scan pattern, most monitors use this scan method.

The interlaced scan pattern is a pattern used for scanning conducted by skipping over one line between the scanning lines. The zigzag scan pattern, instead of reading the pixels sequentially, reads pixels following a zigzag pattern.

The progressive scan method and the interlaced scan method read the entire pixel information of an image regardless of the importance of particular portions of the image. Thus, these methods are inferior in terms of the memory efficiency. The zigzag scan method must go through a separate conversion process. Thus, longer processing time is required and the calculation is complicated in this method.

SUMMARY OF THE INVENTION

Applying the observation that human visual sense is generally more sensitive at the central portion of an image than it is at the outer portions of the image, the present invention provides an image retrieval method to read the image contents using the rosette pattern whose scan lines are concentrated at the central part of an image, store indexing information of the database by extracting the characteristic information from the obtained image and to suggest images similar to the query image requested by a user.

DETAILED DESCRIPTION OF THE PREFERRED EMBODIMENTS

Figure 1A:
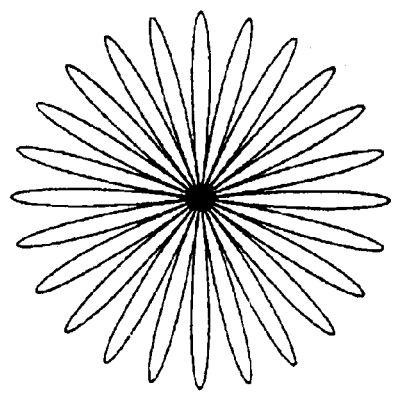
FIG. 1a illustrates a rosette pattern where N1 is 13, N2 is 11, and ΔN is 2.

In order to achieve the above-described purpose, the present invention's image indexing and retrieval method using the rosette pattern for the improvement of retrieval efficiency and performance comprises the steps of: (a) defining a rosette pattern corresponding to the size of a subject image from which information will be extracted; (b) extracting information from the said subject image using the rosette pattern defined in the said step (a); (c) storing the information extracted in the said step (b) into a memory; (d) if a user provides a query image for information retrieval, repeating the said steps (a) and (b) with respect to the said query image; and (e) calculating the similarity between the information stored in the said step (c) and the query image information extracted in the said step (d), and conducting the retrieval using the calculated similarity.

Reference will now be made in detail to the preferred implementation of the present invention's indexing and retrieval method using the rosette pattern for the improvement of retrieval efficiency and performance as illustrated in the accompanying drawings.

First, the rosette scan method used in the present invention will be explained.

A rosette scan method is primarily used for the infrared signal processing or for the medical diagnosis device. The rosette scan pattern is formed by having two optical fields rotate to the opposite directions according to certain rules with a constant rate. The rosette pattern created by the implementation of the rosette scan method on the computer using frequencies $f_1$ and $f_2$ may be expressed in the polar coordinate field with the following Equation 1:

Equation 1

$$r(t) = \delta \cos \pi (f_1 + f_2) t$$

$$\theta(t) = \pi (f_1 - f_2) t$$

The ratio of $f_1$ to $f_2$ ($f_1$ and $f_2$, being the said rotational frequencies) determines the scan speed, total number of petals, area of the petal and location of the cross points of adjacent petals. The relationship of these frequencies are as set forth in the following Equation 2.

$$\frac{N_2}{N_1} = \frac{f_2}{f_1} \qquad \text{[Equation 2]}$$

In the foregoing Equation 2, $N_1$ and $N_2$ are positive integers and $f_1$ is greater than $f_2$.

Only when the ratio of Equation 2 is always a rational number and when $f_1$ and $f_2$ have a greatest common measure $f(N_1=f_1/f;$ and $N_2=f_2/f)$, a completely closed rosette pattern may be formed according to Equation 1. In such an event, the frame frequency of the rosette pattern may be expressed with the following Equation 3 and the total number of petals in the rosette pattern is as set forth in the following Equation 4.

$$T = \frac{1}{f} = \frac{N_1}{f_1} = \frac{N_2}{f_2} \quad \text{[Equation 3]}$$

Equation 4

$$N=N_1+N_2$$

The parameter representing the area of a petal constituting the rosette pattern is as set forth in the following Equation 5:

Equation 5

$$\Delta N=N_1-N_2$$

In the foregoing Equation 5, $\Delta N$ is not the absolute value of the area of the leaf but is a relative value.

Figure 1B:
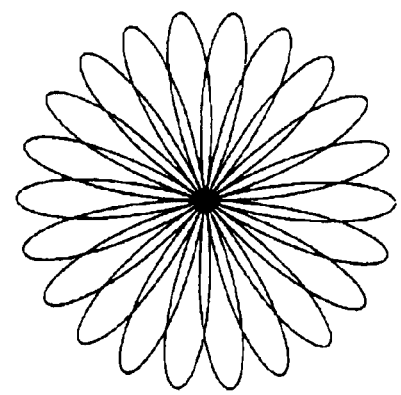
FIG. 1b illustrates a rosette pattern where N1 is 13, N2 is 9, and ΔN is 4.

FIG. 1 illustrates rosette patterns created according to $N_1$, $N_2$ and $\Delta N$ based upon the above Equations. FIG. 1a illustrates a rosette pattern where $N_1$ is 13, $N_2$ is 11 and $\Delta N$ is 2. FIG. 1b illustrates a rosette pattern where $N_1$ is 13, $N_2$ is 9 and $\Delta N$ is 4. As illustrated in FIG. 1, as the value of $\Delta N$ increases, the width of a petal increases, and as $\Delta N$'s value decreases, the width of a petal decreases accordingly. Furthermore, as indicated in FIG. 1, a rosette pattern has more scan points at the center than in the outer parts of the image.

The above-described rosette pattern is applied to the present invention's image indexing and retrieval method.

From the assumption that an ordinary image places the important object at the center part of the image based upon the human psycho-visual system, it may be deduced that important information about an image is normally located at the center part of the image. Accordingly, it is apparent that the application of the rosette pattern on an image would result in a high efficiency and validity in terms of the information description compared with other conventional scan methods. In other words, in the event that the amount of pixel information regarding an image is limited not to exceed a pre-determined amount, the rosette pattern may describe the image more accurately than the conventional progressive scan pattern, interlaced scan pattern or the zigzag scan pattern because the rosette pattern assigns more pixel information for the central part of an image. Thus, important information about an image may be obtained without scanning the entire pixels of the image. Consequently, the memory space required for indexing characteristic image information may be greatly reduced compared with conventional scan patterns.

Figure 2:
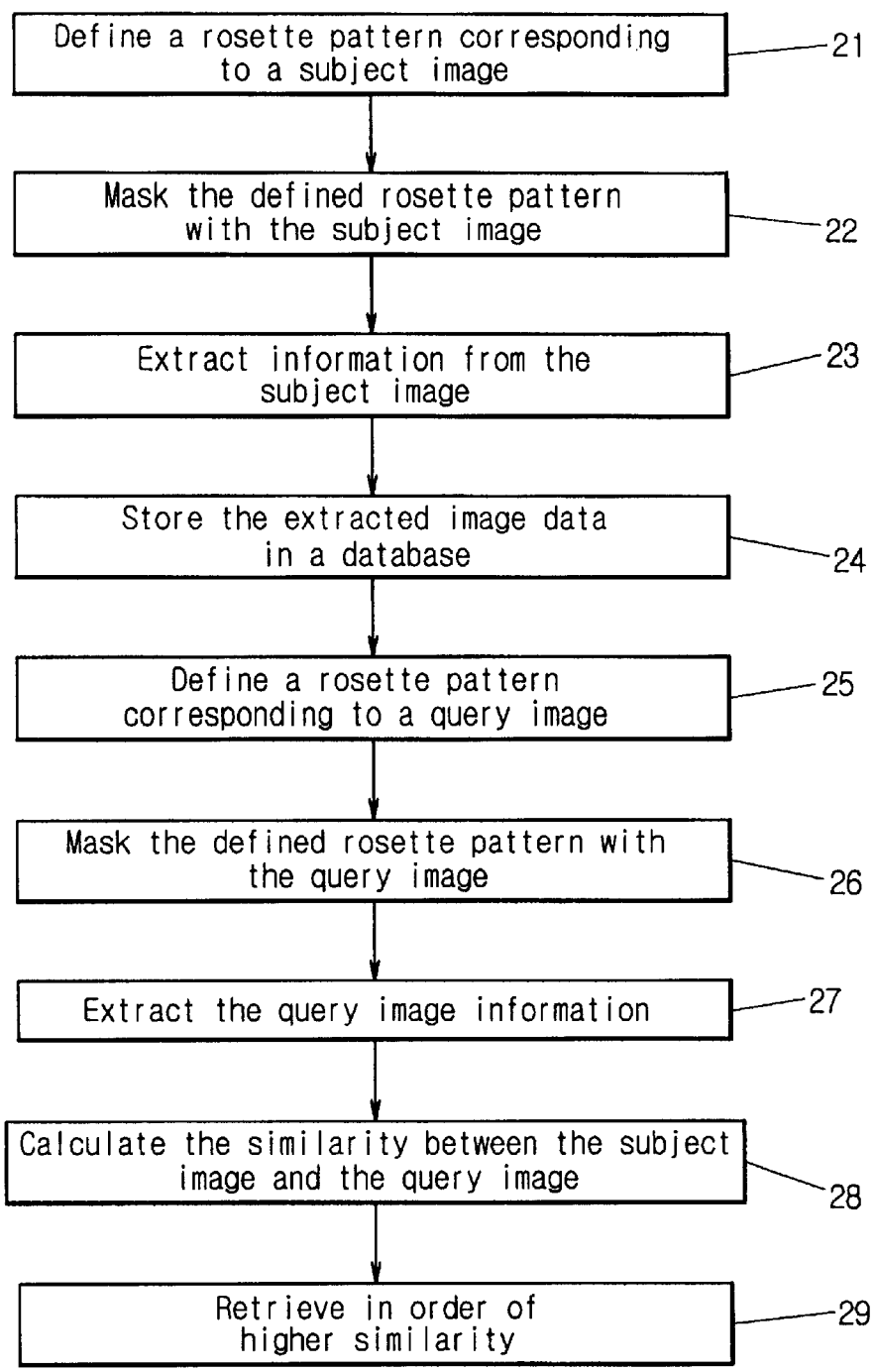
FIG. 2 is a flow chart illustrating a preferred embodiment of the present invention's image retrieval method using the rosette pattern.

FIG. 2 is a flow chart illustrating a preferred embodiment of the present invention's image retrieval method using the rosette pattern.

As illustrated in FIG. 2, first, a rosette pattern to be applied to the image (the "Subject Image") from which the image information will be extracted is defined (21).

As described in FIG. 1, a rosette pattern has a form of square with the same length (height) and breadth. However, the Subject Image is not always in the form of square corresponding to a rosette pattern. To the contrary, most images including, in particular, TV images have the aspect ratio of 3 to 4 or 9 to 16. Thus, a suitable rosette pattern for each Subject Image must be defined.

Figure 3:
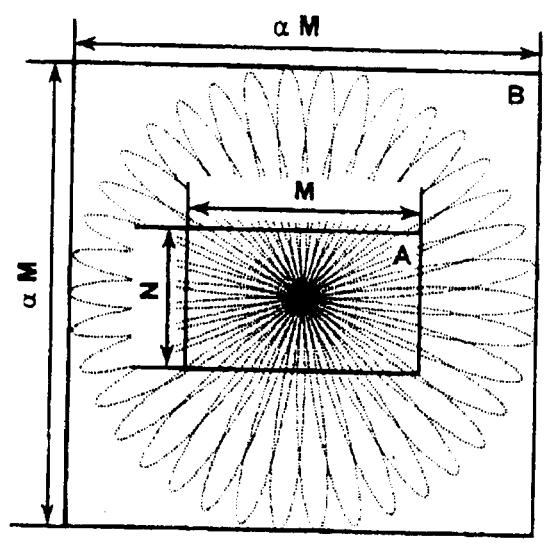
FIG. 3 is an illustration of a rosette pattern defined for the application to the subject image.
Figure 4A:
FIG. 4a is a subject image.
Figure 4B:
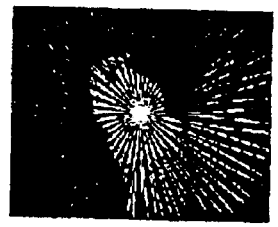
FIG. 4b is an image obtained by applying the rosette pattern to the subject image.
Figure 4C:
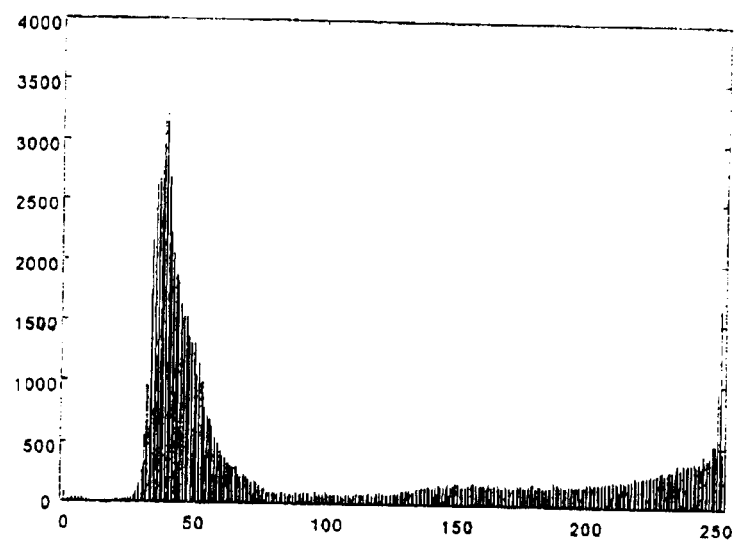
FIG. 4c is a gray histogram distribution of the subject image.
Figure 4D:
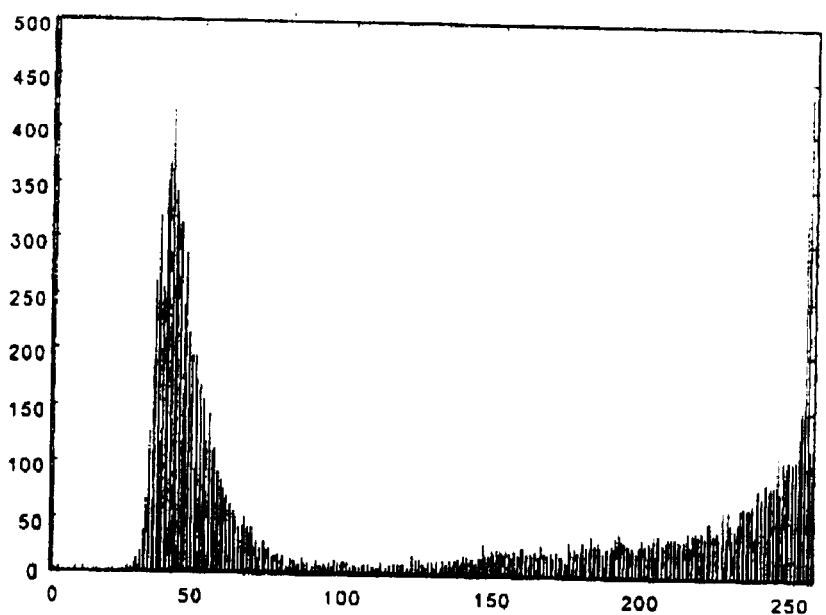
FIG. 4d is a gray histogram distribution of the image using the rosette pattern.

FIG. 3 is an illustration of a rosette pattern defined for the application to the Subject Image. In FIG. 3, A is the area corresponding to the size of the Subject Image. M is the breadth of the Subject Image and N is the height of the Subject Image. According to the preferred embodiment of the present invention, in order to apply the rosette pattern to the Subject Image of non-square form, a rosette pattern with area B which is larger than the Subject Image is defined. The size of the rosette pattern is determined based upon the greater of the breadth or the height of the Subject Image. In other words, if M is greater than N, the rosette pattern with size $\delta=\alpha M$ is defined from the value of M and if M is less than N, the rosette pattern with size $\delta=\alpha N$ is defined from the value of N. In FIG. 3, because M is greater than N, the scale factor $\alpha$ is multiplied to M. Thus, the rosette pattern has the breadth and length (height) of $\alpha M$. The trace of the defined rosette pattern may be expressed with x(t), a function of time for the x coordinates and y(t), a function of time for the y coordinates as set forth in the following Equation 6:

$$x(t) = \frac{\delta}{2}(\cos\omega_1 t_s + \cos\omega_2 t_s) \quad \text{[Equation 6]}$$

$$y(t) = \frac{\delta}{2}(\cos\omega_1 t_s - \cos\omega_2 t_s)$$

In the foregoing Equation 6, $\omega_1$ and $\omega_2$ are rotational speeds for forming the pattern and $t_S$ is a continuous sampling time.

After a rosette pattern corresponding to the Subject Image is defined, the masking of the defined rosette pattern is conducted upon the Subject Image (22). Although the image information may be extracted by scanning the Subject Image from the beginning using the rosette pattern, it would take a long time to scan the Subject Image in such a manner. Thus, in the present invention, a rosette pattern is defined first for the Subject Image and then such rosette pattern is masked upon the Subject Image.

After the masking, the image information is extracted from each sampling point, in other words, from the relevant pixels (23). Then, the extracted information is stored in the memory. According to the preferred embodiment of the present invention, the information is stored in a two-dimensional memory. Where the memory address for the X coordinate is I and the memory address for the Y coordinate is J, the values of I and J are determined according to the following Equation 7. That is, the array number of each sample points of RP can be obtained by rounding the Equation 6 toward zero. The gray scale of image pixels masked by the I×J is stored into the memory by Equation 7:

Equation 7

$$I=\lfloor x(t_S)+\delta \rfloor$$

$$J=\lfloor y(t_S)+\delta \rfloor$$

The Gauss function $\lfloor\ \rfloor$ is applied to I and J in order to match $x(t_S)$ and $y(t_S)$, that may not be integers, into the memory addresses which are integers.

As described above, the Subject Image does not exist in every portion of the defined rosette pattern. Thus, it is not necessary to obtain image information for all the pixels in an image. The information only with respect to the portions in which the Subject Image exists needs to be stored. Thus, the image information is stored into the memory applying the limitation described in the following Equation 8:

Equation 8

$$S(n)=\text{pixel}(I, J) \text{ if } I \leq M, J \leq N$$

FIG. 4 illustrates the Subject Image, an image upon which the rosette pattern has been applied, and the gray histogram distributions for the said images. FIG. 4a is the Subject Image; FIG. 4b is an image obtained by applying the rosette pattern to the Subject Image; FIG. 4c is a gray histogram distribution of the Subject Image; and FIG. 4d is a gray histogram distribution of the image using the rosette pattern.

As illustrated in FIG. 4, the gray distribution for the image obtained from the application of the rosette pattern is almost identical to the gray histogram distribution for the original Subject Image. From these histogram distributions, it is demonstrated that the number of pixels scanned through the rosette pattern is larger at the central portion of an image than at the outer portions of the image. Furthermore, it is demonstrated that using the above-described method, adequate information regarding the image may be obtained. Additionally, it is shown that the trace points upon the rosette pattern contain local positional information regarding the objects in the image.

After a database is constructed by storing the Subject Image into a memory using the said rosette pattern, information regarding a query image that a user desires to retrieve is inputted. The information regarding the query image is extracted using the rosette pattern in the same manner as the extraction of information for the Subject Image. First, a rosette pattern corresponding to the size of the query image is defined (25). Then, the defined rosette pattern is masked upon the query image (26) and the information regarding the query image is extracted (27).

According to the preferred embodiment of the present invention, the similarity between the query image and the stored Subject Images is calculated by comparing the relevant gray histogram distributions (28). More specifically, the difference of the Euclidean distance is calculated between the gray histogram distributions of the image stored in the database and the query image according to the following Equation 9.

$$d(Q, I) = \left[ \sum_{k=1}^{n} (Q_k - I_k)^2 \right]^{1/2} \quad \text{[Equation 9]}$$

In the foregoing Equation 9, $Q_k$ is the histogram of the query image, $I_k$ is the histogram of the image stored in the database. k represents the histogram bin.

The less the value resulting from Equation 9 is, the greater the similarity between the images is. The retrieval is conducted in the order of high similarity (29).

As described above, the present invention's image indexing and retrieval method using the rosette pattern for the improvement of retrieval efficiency and performance has a merit in that the image information may be stored and retrieved effectively through the rosette pattern, even with a small number of pixels because it does not read the information from the entire pixels of the image but uses the rosette pattern, which has more scan lines concentrated at the center area of the image. Furthermore, the retrieval efficiency achieved in the present invention is higher than the efficiency in the conventional histogram distribution method. Additionally, because fewer pixels are used, the memory space required for the indexing may be reduced significantly.

What is claimed is:

1. An image indexing and retrieval method using the rosette pattern for the improvement of retrieval efficiency and performance, comprising the steps of:

(a) defining a rosette pattern corresponding to the size of a subject image from which information will be extracted;

(b) extracting information from the said subject image using the rosette pattern defined in the said step (a);

(c) storing the information extracted in the said step (b) into a memory;

(d) if a user submits a query image for information retrieval, repeating the said steps (a) and (b) with respect to the said query image; and (e) calculating the similarity between the information stored in the said step (c) and the query image information extracted in the said step (d), and conducting the retrieval using the calculated similarity.

2. The image indexing and retrieval method using the rosette pattern for the improvement of retrieval efficiency and performance according to claim 1, wherein the rosette pattern defined in the said step (a) is defined corresponding to the longer of the breadth or the length (height) of the said subject image.

3. The image indexing and retrieval method using the rosette pattern for the improvement of retrieval efficiency and performance according to claim 1, wherein the information extraction in the said step (b) is conducted by masking the rosette pattern on the said subject image.

4. The image indexing and retrieval method using the rosette pattern for the improvement of retrieval efficiency and performance according to claim 1, wherein the similarity in the said step (c) is calculated by using the Euclid distance between the gray histogram distributions of the said stored subject image and the said query image.

* * * * *